United States Patent [19]

Cuscurida et al.

[11] 4,221,877

[45] Sep. 9, 1980

[54] MODIFIED DIPHENYLMETHANE DIISOCYANATES USEFUL IN POLYURETHANES OR POLYISOCYANURATES

[75] Inventors: Michael Cuscurida; Robert L. Zimmerman, both of Austin, Tex.; Bobbie J. Ramey, deceased, late of Austin, Tex., by Sara N. Ramey, executrix

[73] Assignee: Texaco Development Corp., White Plains, N.Y.

[21] Appl. No.: 872,985

[22] Filed: Jan. 27, 1978

Related U.S. Application Data

[63] Continuation-in-part of Ser. No. 796,936, May 16, 1977, abandoned, which is a continuation-in-part of Ser. No. 710,780, Aug. 2, 1976, abandoned.

[51] Int. Cl.² .................. C08G 18/14; C08G 18/78
[52] U.S. Cl. ...................................... 521/160; 521/99; 521/103; 521/105; 521/106; 521/107; 521/108; 521/113; 521/117; 521/123; 521/124; 521/125; 521/127; 521/129; 521/137; 521/902; 528/59; 528/67; 260/453 AB
[58] Field of Search ................. 521/160, 162; 528/44, 528/67, 59; 260/453 AB

[56] References Cited

U.S. PATENT DOCUMENTS

| | | | |
|---|---|---|---|
| 2,683,730 | 7/1954 | Seeger et al. | 260/453 |
| 2,865,869 | 12/1958 | Hindersinn et al. | 260/2.5 |
| 2,950,263 | 8/1960 | Abbotson et al. | 260/2.5 |
| 3,058,925 | 10/1962 | Robitschek | 260/2.5 |
| 3,098,047 | 7/1963 | Tapas et al. | 260/2.5 |
| 3,124,605 | 3/1964 | Wagner | 528/231 |
| 3,214,392 | 10/1965 | Worsley | 260/2.5 |
| 3,297,597 | 1/1967 | Edwards et al. | 260/2.5 |
| 3,423,344 | 1/1969 | Odinak et al. | 260/2.5 |
| 3,526,652 | 9/1970 | Powers | 260/453 AB |
| 3,899,454 | 8/1975 | Wagner et al. | 528/44 |
| 3,903,127 | 9/1975 | Wagner et al. | 260/453 AB |
| 3,976,622 | 8/1976 | Wagner et al. | 260/77.5 AT |

FOREIGN PATENT DOCUMENTS 700026 12/1964 Canada.

OTHER PUBLICATIONS

D.A.S. 1,131,877, Bayer A/G, Jun. 20, 1962.

*Primary Examiner*—H. S. Cockeram
*Attorney, Agent, or Firm*—Carl G. Ries; Thomas H. Whaley; James L. Bailey

[57] ABSTRACT

Covers a water-modified diisocyanate mixture obtained from water-treating a diphenylmethane diisocyanate to provide a diisocyanate mixture comprising 3–25 percent by weight of diphenylmethane biuret isocyanate and 75–97 percent diphenylmethane diisocyanate. Also covers the use of said water-modified diphenylmethane diisocyanate in preparing an improved polyurethane or polyisocyanurate polymer. Also covers said polymers.

3 Claims, No Drawings

MODIFIED DIPHENYLMETHANE DIISOCYANATES USEFUL IN POLYURETHANES OR POLYISOCYANURATES

REFERENCE TO RELATED DISCLOSURE

This application is a continuation-in-part of copending, commonly assigned application, Ser. No. 796,936, filed May 16, 1977 now abandoned, which in turn is a continuation-in-part of application Ser. No. 710,780, filed Aug. 2, 1976, now abandoned.

BACKGROUND OF THE INVENTION

1. Field of the Invention

This invention pertains to the field of polyurethane or polyisocyanurate polymers. More particularly this invention relates to use of specific polyisocyanate derivatives as a polyisocyanate source.

2. Description of the Prior Art

Polyurethane polymers such as polyurethane elastomers and foams are broadly produced by reacting an aromatic polyisocyanate and a polyol such as a polyester or polyether polyol in presence of a catalyst. Likewise, by proper choice of catalyst, polyisocyanurate polymers may be made from the same materials. Here the isocyanate groups trimerize to form the isocyanurate linkages. In many cases, the polymer may be mixed in character whereby it contains both isocyanurate groups as well as urethane linkages. By utilizing an isocyanurate group formation catalyst, the initially formed urethane quasi-prepolymer containing active isocyanate groups subsequently reacts with excess isocyanate present to form isocyanurate groups. The ultimately produced urethane-modified polyisocyanurate polymer is simply and commonly called a polyisocyanurate polymer though both groups are present. One useful class of organic polyisocyanates employed to form both polyurethanes and polyisocyanurates or mixed polymers of this type are diisocyanates.

In some instances, the diphenylmethane diisocyanates (MDI-type isocyanates) have been found to be somewhat lacking in utility. For example, it has been found that when one employs a diphenylmethane diisocyanate to prepare a flexible foam, the resultant foam quickly collapses. In other instances, the polymers formed therefrom such as in the form of elastomers, rigid foams, etc., are somewhat deficient in one or more measured physical properties of the resultant product.

It is therefore an aim of the present invention to provide a modified diphenylmethane diisocyanate which can be usefully employed in the above applications and others. It is a particular object to provide flexible polyurethanes or polyisocyanurate polymers in foam form which retain their integral character without demonstrating signs of collapse by employing modified isocyanates of this type.

SUMMARY OF THE INVENTION

It has now been found that certain water-modified diphenylmethane diisocyanates are extremely useful as an organic polyisocyanate source is preparing a wide variety of polyurethane and polyisocyanurate foams and elastomers. Said polymers are prepared by reacting together in presence of a catalyst for polyurethane and polyisocyanurate polymer formation, a polyol and a water-modified diphenylmethane diisocyanate.

The water-modified polyisocyanate mixtures are obtained from water-treating a diphenylmethane diisocyanate to provide a diisocyanate mixture comprising 3–25 percent by weight of diphenylmethane biuret isocyanate and 75–97 percent diphenylmethane diisocyanate.

DETAILED DESCRIPTION OF THE INVENTION

In carrying out the process of the invention, a diphenylmethane diisocyanate is provided which is then modified by reacting it with water. The water produces biuret linkages which, as will be shown later, are essential to produce suitable polyisocyanate components useful in preparing polyurethanes or polyisocyanurates.

The diphenylmethane diisocyanate is a known material which is obtained by phosgenation of diphenylmethane diamine. The latter, in turn, is obtained by interaction of formaldehyde, hydrochloric acid and primary aromatic amines, such as aniline, o-chloroaniline, or toluidine, and the like using procedures well-known in the art with respect to polyamine production. See, for example, U.S. Pat. Nos. 2,683,730; 2,950,263 and Canadian Pat. No. 700,026, and German specification 1,131,877.

The diphenylmethane diisocyanate (hereinafter MDI) is then modified by reaction with water. Usually the reaction with water is carried out with or without application of heat by reacting less than about 0.3 equivalents of water per equivalent of diisocyanate to produce the diisocyanate mixture which contains the biuret linkages. Usually from 0.1 to less than 0.3 equivalents of water should be employed per equivalent of diisocyanate to give a suitable water-modified diisocyanate. Water employed in excess of the 0.3 equivalent amount generally produces a product unsuitable for optimum foam formation. Likewise, use of less than about 0.1 equivalents water does not allow the biuret reaction to proceed to the desired extent.

The modified diisocyanates may usually be prepared by carrying out the contact of water and isocyanate at a temperature ranging from about room temperature up to about 150° C. for ¼–24 hours time.

As noted above, by treating diphenylmethane diisocyanate with water within the equivalent basis noted a mixture of components is provided. It has been found that said mixture should be comprised of the biuret component in an amount of about 3 percent to about 25 percent by weight of the total mixture. When the biuret content is exceeded in terms of excess biuret compound being present in the mixture poor foams result, as will be seen hereinafter. On the other hand, it is also necessary that at least a minimal amount of biuret compound be present in the mixture, and therefore sufficient water is needed to convert the diisocyanate to this minimum biuret content.

Employed in conjunction with the above discussed water-modified diisocyanate is a polyol. These are known materials usually employed in making polyurethanes or polyisocyanurates, and a wide variety of varying polyols may be used here. Usually such polyols have hydroxyl numbers ranging from about 25 to about 1500. More often the hydroxyl number ranges from about 25 to about 700. Choice of the particular polyol would depend in part whether or not a rigid or flexible foam is desired or an elastomer or solid polymer. Usually, such polyols have from about 2 to about 8 hydroxyl groups per molecule. Preferred polyols are polyether or polyester polyols.

Illustrative polyols include the following:

1. Polyethers, for example, polyoxyalkylene glycols such as the polyoxyethylene glycols prepared by the addition of ethylene oxide to water, ethylene glycol or diethylene glycol, polyoxypropylene glycols prepared by the addition of 1,2-propylene oxide to water, propylene glycol or dipropylene glycol, mixed oxyethyleneoxypropylene polyglycols prepared in a similar manner utilizing a mixture of ethylene oxide and 1,2-propylene oxide; polyether glycols prepared by reacting ethylene oxide, propylene oxide or mixtures thereof with mono- and polynuclear polyhydric phenols, e.g., catechol, resorcinol, hydroquinone, 2,2-bis(hydroxyphenyl)propane, bis(p-hydroxyphenyl) methane, and the like; polyethers prepared by reacting ethylene oxide, propylene oxide or mixtures thereof with aliphatic polyols such as glycerol, trimethylolpropane, 1,2,6-hexanetriol, pentaerythritol, sorbitol, sucrose, alkyl glycosides, e.g., the methyl, ethyl, propyl, butyl, and 2-ethylhexyl arabinosides, xylosides, fructosides, glucosides, rhamnosides, etc.; polyethers prepared by reacting ethylene oxide, propylene oxide or mixtures thereof with alicyclic polyols such as tetramethylolcyclohexanol, polyols containing a heterocyclic nucleus such as 3,3,5-tris(hydroxymethyl)-5-methyl-4-hdroxytetrahydropyran, and 3,3,5,5-tetrakis (hydroxymethyl)-4-hydroxytetrahydropyran, or polyols containing an aromatic nucleus such as 2,2-bis(hydroxyphenyl)ethanol, pyrogallol, phloroglucinol, tris(hydroxyphenyl)alkanes, e.g., 1,1,3-tris(hydroxyphenyl)ethanes, and 1,1,3-tris (hydroxyphenyl)propanes, etc., tetrakis(hydroxyphenyl)alkanes, e.g. 1,1,3,3-tetrakis(hydroxy-3-methylphenyl)propanes, 1,1,4,4-tetrakis(hydroxyphenyl)butanes and the like:

2. Polyol mixtures comprising a polyol adduct produced by mixing under hydroxyalkylation conditions from two to 20 molecular equivalents of ethylene oxide, propylene oxide, or 1,2-butylene oxide or mixtures thereof, and one amine equivalent of a polyamine mixture, 100 parts of said polyamine mixture containing from 30 to 90 parts of methylenedianilines, the remaining parts being triamines and polyamines of higher molecular weight, said polyamine mixture having been formed by acid condensation of aniline and formaldehyde, see, for example, U.S. Pat. No. 3,423,344;

3. Polyols obtaned by the Mannich condensation of a phenolic compound with formaldehyde and alkanolamine, and the alkylene oxide adducts thereof. See, for example, U.S. Pat. No. 3,297,597;

4. Hydroxyalkylated aliphatic diamines such as N,N,N',N'-tetrakis(2-hydroxypropyl)ethylenediamine;

5. Hydroxyalkylated isocyanuric acids such as tris(2-hydroxyethyl)-isocyanurate, and the like; and 6. Polyester polyols prepared from dibasic carboxylic acids useful in preparing the polyesters have no functional groups containing active hydrogen atoms other than their carboxylic acid groups. They are preferably unsaturated. Acids such as phthalic acid, terephthalic acid, isophthalic acid, succinic acid, glutaric acid, adipic acid, and pimelic acid are suitable. Anhydrides of these acids can be used also. The polyol component or components of the polyester are preferably trihydric alcohols such as trimethylolethane, trimethylolpropane, mannitol, 1,2,6-hexanetriol, glycerol, and pentaerythritol. Mixtures of two or more such polyols can be used. In addition a mixture of one or more of said trihydric alcohols with a minor amount of a dihydric alcohol such as ethylene glycol, diethylene glycol, 1,2-propylene glycol, 1,4-butanediol, cyclohexanediol, and the like, can also be used in esterification of the dibasic carboxylic acid.

Other useful polyols of employment in the process of the invention are those polyols containing phosphorus and/or chlorine and bromine such as the polyester polyols based on chlorendic acid, tetrabromophthalic acid and tetrachlorophthalic acid or the corresponding anhydrides thereof; see, for example, U.S. Pat. Nos. 2,865,869; 3,058,925; 3,098,047; and 3,214,392. Generally, said polyester polyols are solid and require blending with a lower viscosity polyol before mixing with the various other components of the high temperature resistant cellular reaction mixture. Any of the above polyethers having viscosities, at 25° C., below about 20,000 centipoises can be used as diluents for the aforesaid halogenated polyester polyols provided that the overall hydroxyl functionality and equivalent weight of the resulting mixtures fall within the limits set forth above.

Illustrative of polyether polyols which can be used as diluents for the above halogenated polyester polyols are the polyoxyalkylene glycols such as those prepared from diethylene glycol, dipropylene glycol and the like, the alkoxylated aliphatic polyols such as alkoxylated glycerol, sorbitol, trimethylolpropane, pentaerythritol, 1,2,6-hexanetriol, and the like. Generally speaking, however, the preferred polyether polyols are the polyoxyalkylene glycols employed in an amount corresponding to from about 20 to about 50 percent by weight of the polyol mixture. Specific polyester polyols are those comprising the product of reaction of chlorendic acid or the anhydride thereof and a polyhydric alcohol such as glycerol, trimethylolethane, trimethylolpropane and 1,2-hexanetriol.

As noted above, preferred polyols are polyester or polyether polyols having a hydroxyl number ranging from about 700 to about 25, or lower. When it is desired to provide a flexible foam, the hydroxyl number is preferably in the range of from about 25 to 60. For rigid foams, the hydroxyl number is preferably in the range from 350 to 700. Semi-rigid foams of desired flexibility are provided when the hydroxyl number is intermediate to the ranges just given. When a flexible urethane or isocyanurate foam is desired, the polyol usually has an average functionality of from about 2 to about 4 and molecular weight of from about 2,000 to about 4,000. For rigid urethane foams, the functionality of the polyol component more often falls within the range of from about 4 to about 7. Such rigid urethane foams are usually prepared from polyols having a molecular weight ranging from about 300 to about 1,000. Rigid isocyanurate foams usually are derived from a polyol which has a molecular weight of 75–2000.

The amount of hydroxyl-containing polyol compound to be used relative to the water-modified diisocyanate compound normally should be such that the isocyanate groups are present in at least an equivalent amount, and preferably in slight excess. Preferably, the ingredients will be proportioned so as to provide from about 1.05 to about 1.5 mole equivalents of isocyanate groups per mole equivalent of hydroxyl groups.

In order to form the polyurethane polymer a catalyst useful in preparing polymers of this type is employed in the usual manner. Such catalyst may include one or more of the following:

(a) Tertiary amines such as trimethylamine, triethylamine, N-methylmorpholine, N-ethylmorpholine, N,N-dimethylbenzylamine, N,N-dimethylethanolamine, N,N,N',N'-tetramethyl-1,3- butanediamine, triethanolamine, 1,4-diazabicyclo[2.2.2]octane and the like;
(b) Tertiary phosphines such as trialkylphosphines, dialkylbenzylphosphines, and the like;
(c) Strong bases such as alkali and alkaline earth metal hydroxides, alkoxides, and phenoxides;
(d) Acidic metal salts of strong acids such as ferric chloride, stannic chloride, stannous chloride, antimony trichloride, bismuth nitrate and chloride, and the like;
(e) Chelates of various metals such as those which can be obtained from acetylacetone, benzoylacetone, trifluoroacetyl acetone, ethyl acetoacetate, salicyaldehyde, cyclopentanone-2-carboxylate, acetylacetoneimine, bisacetylacetonealkylenediamines, salicylaldehydeimine, and the like, with various metals such as Be, Mg, Zn, Cd, Pd, Ti, Zr, Sn, As, Bi, Cr, Mo, Mn, Fe, Co, and Ni;
(f) Alcoholates and phenolates of various metals such as $Ti(OR)_4$, $Sn(OR)_4$, $Al(OR)_3$, and the like, wherein R is alkyl or aryl, and the reaction products of alcoholates with carboxylic acids, beta-diketones, and 2-(N,N-dialkylamino) alkanols;
(g) Salts of organic acids with a variety of metals such as alkali metals, alkaline earth metals, Al, Sn, Pb, Mn, Co, Ni, and Cu, including, for example, sodium acetate, stannous octoate, stannous oleate, lead octoate, metallic driers such as manganese and cobalt naphthenate, and the like; and
(h) Organometallic derivatives of tetravalent tin, trivalent and pentavalent As, Sb, and Bi, and metal carbonyls of iron and cobalt.

If one desires to prepare a polyisocyanurate polymer usually a tertiary amine of the type above described or others is employed to catalyze the reaction between an isocyanate group and active hydrogen atom.

Representative of said tertiary amine catalysts are: N,N',N''-trialkylaminoalkylhexahydrotrizaines such as N,N',N''-tris(dimethylaminomethyl)hexahydrotriazine, N,N',N''-tris(diethylaminoethyl)-hexahydrotriazine, N',N', N'''-tris(diethylaminopropyl)hexahydrotriazine and the like; mono-di- and tri(dialkylaminoalkyl)monohydric phenols or thiophenols such as 2-(dimethylaminomethyl)-phenol, 2-(dimethylaminobutyl)phenol, 2-(dimethylaminoethyl)thiophenol, 2-(diethylaminoethyl)-thiophenol, 2,4-bis(dimethylaminoethyl)phenol, 2,4-bis(diethylaminopropyl)thiophenol, 2,4-bis(dipropylaminoethyl)thiophenol, 2,4,6-tris(dimethylamino)thiophenol, 2,4-bis(diethylaminopropyl)thiophenol, 2,4-bis(dipropylaminoethyl)thiophenol, 2,4,6-tris(dimethylaminoethyl)phenol, 2,4,6-tris(diethylaminoethyl)-thiophenol, 2,4,6-tris(dimethylaminoethyl)thiophenol and the like; N,N,N',N'-tetraalkylenediamines such as N,N,N', N'-tetramethyl-1,3-propanediamine, N,N,N',N'-tetramethyl-1,3-butanediamine, N,N,N',N'-tetramethylethylenediamine, N,N,N'N-tetraethylethylenediamine and the like; N,N-dialkylcyclohexylamines such as N,N-dimethylcyclohexylamine, N,N-diethylcyclohexylamine and the like; N-alkylmorpholines such as N-methylmorpholine, N-ethylmorpholine and the like; N,N-dialkylalkanolamines such as N,N-dimethylethanolamine, N,N-diethylethanolamine and the like: N,N,N',N'-tetraalkylguanidines such as N,N,N'N'-tetramethylguanidine, N,N,N'N'-tetraethylguanidine and the like. The preferred tertiary amine catalysts for use in the process of the invention are the N,N',N''-tris-(alkylaminoalkyl)hexahydrotriazines, the mono(-dialkylaminoalkyl)phenols, and the 2,4,6-tris(alkylaminoalkyl)phenols.

Of course combinations of any of the above polyurethane or polyisocyanurate catalysts may be employed. Usually the amount of catalyst employed ranges from about 0.05 to about 4.0 weight percent based on the combined weight of the polyol compound and water-modified polyisocyanate. More often the amount of catalyst used is 0.1–1.0 weight percent.

When a foam is desired, foaming can be accomplished by employing a minor amount, for example, from about 0.5 to 25 weight percent, based on total weight of the reaction mixture, of blowing agents which are vaporized by the exotherm of the isocyanate-reactive hydrogen reaction. The preferred blowing agents are certain halogen-substituted aliphatic hydrocarbons which have boiling points between about 40° C. and 70° C., and which vaporize at or below the temperature of the foaming mass. The blowing agents include, for example, trichloromonofluoromethane, dichlorodifluoromethane, dichloromonofluoromethane, dichloromethane, bromotrifluoromethane, chlorodifluoromethane, 1,1-dichloro-1-fluoroethane, 1,1-difluoro-1,2,2-trichloroethane, 1,1,1-trichloro-2,2,2-trifluoroethane, 2-chloro-1,1,1,2,3,3,4,4,4-nonafluorobutane, hexafluorocyclobutane, and octofluorocyclobutane. Other useful blowing agents include water and low-boiling hydrocarbons such as butane, pentane, hexane, cyclohexane, and the like. Many other compounds easily volatilized by the exotherm of the isocyanate-reactive hydrogen reaction also can be employed. A further class of blowing agents include the thermally unstable compounds which liberate gases upon heating, such as N,N'-dimethyl-N, N'-dinitrosoterephthalamide.

The amount of blowing agent used will vary with the density desired in the foamed product. In general, it may be stated that for 100 grams of reaction mixture containing an average isocyanate to reactive hydrogen ratio of about 1:1, from 0.005 to 0.3 mole of gas are used to provide densities ranging from 30 to 1 pound per cubic foot respectively.

Other optional additives such as dispersing agents, cells stabilizers, surfactants, fillers, flame retardants, smoke depressants, and the like which are commonly employed in the fabrication of polyurethane or polyisocyanurate polymers and particularly those polymers in foam form, can be employed in the process of the invention. Thus, a finer cell structure may be obtained if water-soluble organosilicone polymers are used as surfactants of the reaction mix. Organosilicone polymers obtained by condensing a polyalkoxy polysilane with the monoether of a polyalkylene glycol in the presence of an acid catalyst are representative of those surfactants which can be used for this purpose. Other surfactants such as ethylene oxide modified sorbitan monopalmitate or ethylene oxide modified polypropylene ether glycol may be used if desired to obtain better dispersion of the components of the foam mixture.

Illustrative flame retardants are tris(haloalkyl)phosphates such as tris(2-chloroethyl)phosphate, tris(2-bromoethyl)phosphate, tris(2,3-dichloropropyl)phosphate, ammonium polyphosphates, sodium borate, di(2-haloalkyl)-2-haloalkanephosphonates such as di(2-chloropropyl) 2-chloropropane phosphonate, di(2-bromopropyl) 2-bromopropane phosphonate, antimony oxides, polyvinyl chloride resins, dialkyl alkanephosphonates such as dimethyl benzylphosphonate, diamyl amylphosphonate, trimethyl phosphorothionate, ethylene phenyl phosphorothionate, tetrahalobisphenol such as tetrachlorobisphenol A, tetrabromobisphenol A and the like. Said flame retardants are employed in the compositions of the invention in the appropriate amounts necessary to impart the desired degree of flame retardancy to the resulting cellular polymer.

Suitable illustrative inert inorganic fillers are calcium carbonate, ammonium phosphate, polyammonium phosphate, calcium phosphate, ammonium sulfate, silica asbestos, glass, glass fiber, mica, carbon black, carbon fiber, wood flour, antimony oxides, etc. Illustrative organic fillers are the various polymers, copolymers, and terpolymers of vinyl chloride, vinyl acetate, acrylonitrile, acrylamide, styrene, ethylene, propylene, butadiene, divinyl benzene, and the like. Cellulose, starch and organic boron fiber can also be employed, if desired.

The use of halogen-containing fillers is particularly advantageous since the use of such materials imparts additional flame resistance to the produced resin whether foamed or cast.

Foams may be prepared by the so-called "one-shot" method or the "quasi-prepolymer method". In the one-shot method the ingredients are simultaneously intimately mixed with each other to provide a foam by a one-step process. In accordance with the quasi-prepolymer method, a portion of the polyol compound is reacted in the absence of a catalyst with the polyisocyanate component. To prepare a foam, the remaining portion of the polyol is added and the two components are allowed to react in the presence of catalytic systems such as those discussed above and other appropriate additives. Usually a flexible foam is prepared by the one-shot method whereas rigid foams may be produced by that method or the quasi-prepolymer method. Polyurethane or polyisocyanurate elastomers, coatings, solid polymers, etc., may also be prepared by known techniques. Thus, foams or non-foamed materials may be prepared with equal facility.

The polymers of the invention may be used for a wide variety of end-uses. For example, the rigid, flexible, semi-flexible, or semi-rigid types of polyurethane or polyisocyanurate foams may be used for thermal insulation and as building materials and the like. As specific examples, the cellular products of the invention can be employed as thermal barriers in the construction of fire walls, in the building of industrial and institutional structures, and as insulating materials for high temperature pipelines and ovens, in supersonic aircraft and also as missile components.

As yet another example, semi-flexible integral skin polyurethane or polyisocyanurate foams may be made which can be used as arm rests in cars and the like. Solid polyurethane or polyisocyanurate elastomer compositions which can be prepared here may be useful as recreational surfaces, sealants, gaskets, caulks, textile covering elastomers, floor coverings, molding materials and the like. In addition to arm rests, flexible cellular compositions of this type may be useful in beddings, seat cushions, crash pads and the like.

The following examples illustrate the practice of the invention. It is understood, of course, that these examples are merely illustrative, and that the invention is not to be limited thereto.

EXAMPLE 1

Here a mixed isomeric diphenylmethane diisocyanate (4,4-isomer, 2,4'-isomer and 2,2'-isomer) was modified with water to prepare a useful water-modified diisocyanate of the invention. The diisocyanate was reacted with water at a ratio of about 0.1 equivalent of water to 1.0 equivalent of isocyanate as follows:

300 grams of the diisocyanate was charged to a 500 ml. 3-neck flask equipped with heating mantle, stirrer, thermometer, and temperature controller. The isocyanate was heated to 120° C. Then a total of 2.2 grams of water was added, in small increments, over a 10 minute period. Gas evolution was noted. The mixture was held at about 120° C. for about another 2 hours, cooled and poured into a container. The green resultant liquid was found to have an equivalent weight of 148.4. IR spectra showed bands at 5.82, 5.97 and 6.28 and in the 7–9$\mu$ region indicating biuret linkages.

EXAMPLE 2

The procedure of Example 1 was followed except that a reaction temperature of 80° C. was used. The liquid product was cloudy. IR analysis indicated the product had more urea linkages than biuret linkages as compared to the product of Example 1. As in Example 1 the starting diisocyanate had the following isomer content: 70 percent 4,4'-isomer, 24 percent 2,4'-isomer, and 4 percent 2,2'-isomer; equivalent weight 125.

EXAMPLE 3

The general procedure of Example 1 was used to prepare a water-modified diisocyanate with the exception that a pure 4,4'-diphenylmethane diisocyanate was employed. The final liquid product had an equivalent weight of 136.4.

EXAMPLE 4

This example was a scaled-up version of Example 1. A 5-liter, 3-neck flask was equipped with heating mantle, stirrer, temperature controller, addition funnel (for adding water), cold trap (dry ice-acetone) and bubbler on the exit line from the flask. Reactants were 3500 grams of filtered isocyanate and 25.20 grams ion-exchanged water. The isocyanate was heated to 120° C., and then the water was added dropwise over a 33 minute period. Some exothermicity and gas evolution was evident. After the water was added, the temperature was held at 120° C., for two hours, then the product was cooled, weighed in a flask, and poured into a container. The weight of product was 3473 grams. It had an equivalent weight of 146.2 and a viscosity of 110 cps at 25° C. The IR analysis of the product showed it to be similar to the product of Example 1.

EXAMPLE 5

The procedure of Example 1 was used with the exception that the reactants were 300 grams of isophorone diisocyanate and 2.4 grams of water. The final product had an equivalent weight of 123.2 and IR analysis showed evidence of both urea and biuret linkages.

EXAMPLE 6

The procedure of Example 1 was used except that a ratio of 0.2 equivalents of water per equivalent of isocyanate was used. The product had an equivalent weight of 167.2.

EXAMPLE 7

The procedure of Example 1 was followed, except that a ratio of 0.3 equivalents of water per equivalent of isocyanate was used. Much foaming was encountered. Even with utilization of a foam trap, foaming could not be controlled. It appears then that a ratio of somewhat less than 0.3 equivalents of water per equivalent of isocyanate should be used to produce a workable water-modified polyisocyanate.

EXAMPLES 8-11

These examples illustrate preparations of flexible foam from both pure diphenylmethane diisocyanate (MDI) and a water-modified MDI. The water-modified MDI was analyzed and found to contain biuret linkages. Flexible foams could not be prepared from similar pure MDI which contained no biuret linkages. Results are given in Table I below.

TABLE I

| Foam No. | 8 | 9 | 10 | 11 |
|---|---|---|---|---|
| Formulation, pbw | | | | |
| THANOL ® SF-5503[1] | 100 | 100 | 100 | 100 |
| JEFFAMINE ® AP-22[2] | 2.0 | 2.0 | 2.0 | 2.0 |
| Water | 2.7 | 2.7 | 2.7 | 2.7 |
| L-5303 Silicone[3] | 1.0 | 1.0 | 1.0 | 1.0 |
| Dibutyltin dilaurate | 0.006 | 0.006 | — | 0.006 |
| THANCAT ® DD[4] | 0.75 | 0.75 | 0.75 | 0.75 |
| THANCAT ® DM-70[5] | 0.25 | 0.25 | 0.25 | — |
| Water-Modified MDI[6] | 50.0 | — | — | — |
| MDI[7] | — | 50.0 | 50.0 | 50.0 |
| Isocyanate index | 0.92 | 1.05 | 1.05 | 1.05 |
| Details of Preparation | | | | |
| Cream time, sec. | 8 | 8 | 10 | 10 |
| Rise time, sec. | 80 | Collapsed in 30 sec. | Collapsed in 45 sec. | |
| Gel time, sec. | 120 | | | |
| Foam Appearance | Excellent, good cell structure | | Collapsed foam | |

[1]32-36 hydroxyl no. high reactivity polyether triol; Jefferson Chemical Company, Inc.
[2]2.2 functionality polymethylene polyphenylamine; Jefferson Chemical Company, Inc.
[3]Silicone surfactant; Union Carbide Chemical Corporation.
[4]Dimethylaminoethyldimethylaminopropyl ether; Jefferson Chemical Company, Inc.
[5]70% N,N'-dimorpholinodiethylether/30% N,N'-dimethylpiperazine; Jefferson Chemical Company, Inc.
[6]Water modified MDI; 70% 4,4'-isomer, 25% 2,4'-isomer, and 4% 2,2'-isomer; biuret identified by infrared at 5.8μ, 5.97μ, 6.28μ, and in the 7-9μ range; equivalent weight 142.5.
[7]Distilled MDI; 70% 4,4'-isomer, 25% 2,4'-isomer and 4% 2,2'-isomer; equivalent weight 125.

EXAMPLES 12-13

Here flexible foams were prepared from a water-treated MDI diisocyanate and an unmodified MDI-type isocyanate. Stable flexible foams could not be prepared from the biuret-free MDI or pure MDI isocyanate. The water-treated isocyanate was prepared by reaction of the same diisocyanate with 0.1 equivalent of water per equivalent of isocyanate at 120° C., for approximately 2 hours. The water-modified isocyanate product had an equivalent weight of 148.4 and biuret linkages were identified by infrared at 5.2μ, 5.97μ, 6.28μ, and in the 7-9μ range. Table II below outlines the formulation, details of preparation and foam properties of the resultant flexible foams.

TABLE II

| Foam No. | 12 | 13 |
|---|---|---|
| Formulation, pbw | | |
| THANOL ® SF-5503 | 100 | 100 |
| JEFFAMINE ® AP-22 | 2.0 | 2.0 |
| Water | 2.7 | 2.7 |
| L-5303 silicone | 1.0 | 1.0 |
| Dibutyltin dilaurate | 0.006 | 0.006 |
| THANCAT ® DD | 0.75 | 0.75 |
| THANCAT ® DM-70 | 0.25 | 0.25 |
| MDI | — | 50.0 |
| Water-treated MDI | 50.0 | — |
| Isocyanate index | 0.88 | 1.05 |
| Details of preparation | | |
| Cream time, sec. | 8 | 8 |
| Rise time, sec. | 80 | Collapsed at 30 sec. |
| Gel time, sec. | 85 | — |
| Foam appearance | Excellent, good cell structure | — |
| Properties | | |
| Density, pcf | 3.1 | — |
| Tensile, psi | 13.1 | — |
| Elongation, % | 137.0 | — |
| Tear, pli | 1.5 | — |
| Compression set, 50% | 50.7 | — |
| 90% | 90.7 | — |
| Humid aging (5 hours. at 250° F.) | | |
| Compression set, 50% | 52.6 | — |
| CLD loss, 50% | 19.3 | — |

EXAMPLES 14-15

Here another MDI-type isocyanate was used as an urethane A component. The same isocyanate was also water-treated and employed in a like comparison. Stable flexible foams could not be prepared from the untreated isocyanate. The particular isocyanate here used was a pure 4,4'-MDI-type isocyanate. This same pure material was also modified with water by reaction of 0.1 equivalent of water per 1.0 equivalent of the diisocyanate at 120° C., for approximately 4 hours. The water-modified product was a low viscosity liquid which had an isocyanate equivalent of 136.5. Biuret linkages were identified by infrared as in the previous examples. Table III gives results below.

TABLE III

| Foam No. | 14 | 15 |
|---|---|---|
| Formulation, pbw | | |
| THANOL ® SF-5503 | 100 | 100 |
| JEFFAMINE ® AP-22 | 2.0 | 2.0 |
| Water | 2.7 | 2.7 |
| L-5303 | 1.0 | 1.0 |
| Dibutyltin dilaurate | 0.006 | 0.006 |

TABLE III-continued

| Foam No. | 14 | 15 |
|---|---|---|
| THANCAT® DD | 0.75 | 0.75 |
| THANCAT® DM-70 | 0.25 | 0.25 |
| Isonate 125 MF[1] | — | 50.0 |
| Water-treated Isonate 125MF | 50 | — |
| Isocyanate index | 0.96 | 1.05 |
| Details of preparation | | |
| Cream time, sec. | 7 | Could not make foam as isocyanate had to be melted. Resultant reaction very fast and foam collapsed |
| Rise time, sec. | 30 | |
| Gel time, sec. | 45 | |
| Foam appearance | Good Cell structure | |

[1] 4,4'-diphenylmethane diisocyanate; the Upjohn Co.

EXAMPLES 16–18

Here flexible foams with good properties were formed from water-treated MDI-type isocyanate produced in a scaled-up preparation. The water-treated diisocyanate was prepared as described in Example 12. The resultant product had a viscosity of 110 cps at 25° C., and an isocyanate equivalent weight of 146.2 and biuret linkages identified by infrared. Formulations, details of foam preparation and foam properties are given in Table IV below.

TABLE IV

| Foam No. | 16 | 17 | 18 |
|---|---|---|---|
| Formulation, pbw | | | |
| THANOL® SF-5503 | 100 | — | — |
| THANOL® SF-6500[1] | — | 100 | 100 |
| JEFFAMINE® AP-22 | 2.0 | — | 2.0 |
| Water | 2.7 | 2.7 | 2.7 |
| L-5303 Silicone | 1.0 | 1.0 | 1.0 |
| THANCAT® DD | 0.75 | 0.75 | 0.75 |
| THANCAT® DM-70 | 0.25 | 0.25 | 0.25 |
| Dibutyltin dilaurate | 0.006 | 0.006 | 0.006 |
| Water-treated MDI | 50.0 | 45.9 | 48.6 |
| Isocyanate index | 0.9 | 0.9 | 0.9 |
| Details of preparation | | | |
| Cream time, sec. | 7.0 | 8.0 | 8.0 |
| Rise time, sec. | 80.0 | 95.0 | 75.0 |
| Gel time, sec. | 105.0 | 150.0 | 120.0 |
| Foam appearance | Good | Good | Good |
| Properties | | | |
| Density, pcf | 3.0 | 3.15 | 3.5 |
| Tensile, psi | 14.9 | 12.9 | 16.3 |
| Elongation, % | 126.0 | 177.0 | 145.0 |
| Tear, pli | 1.2 | 1.5 | 1.4 |
| Compression set, 50% | 49.3 | 75.7 | 68.0 |
| 90% | 86.3 | 91.3 | 90.5 |
| Humid aging (5 hrs. at 250° F.) | | | |
| Compression set, 50% | 67.7 | 67.7 | 76.5 |
| CLD loss, 50% | 11.9 | 4.9 | 4.2 |

[1] 26–29 hydroxyl no. polyether triol available from Jefferson Chemical Co., Inc.

EXAMPLE 19

Here an elastomer was prepared by utilizing a filled, catalyzed B-component. The composition of the B-component was as follows:

| THANOL® F-3000 triol[1] | 63.98 |
|---|---|
| GLOMAX® LL clay[2] | 33.83 |
| THANOL® C-165[1] chain extender | 1.78 |
| Metasol 57C/M[3] catalyst | 0.18 |

-continued

| 2,6-di-t-butyl-p-cresol | 0.22 |
|---|---|

[1] Jefferson Chemical Co., Inc.
[2] Georgia Kaolin
[3] Merck

The elastomer was prepared by mixing at a NCO/OH index of about 1.15 890 grams of the B-component at 25° C. and 110 grams of the unmodified diisocyanate reactant of Example 1. The elastomer specimen was allowed to cure under ambient conditions and gave the following physical properties.

TABLE V

| Tensile strength | 607 psi |
|---|---|
| 100% modulus | 493 psi |
| Elongation | 120% |
| Die C tear resistance | 61 pli |
| 25% compression set, Method B | 5% |
| 10% compression load deflection | 115 psi |
| Shore $A_2$/O sec hardness at 1 hr. | 58 |
| Overnight | 65 |
| Maximum | 68 |

EXAMPLE 20

The procedure of Example 19 was followed with the exception that the water-treated isocyanate of Example 4 was utilized. 874 grams of the B-component of Example 19 was mixed with 126 grams of the water-modified isocyanate.

As can be seen in Table VI below, the cured elastomer formed from a water-modified isocyanate showed enhanced hardness and compression load deflection values compared with the control run of Example 19. Results are given below.

TABLE VI

| Tensile strength | 695 psi |
|---|---|
| 100% modulus | 576 |
| Elongation | 120% |
| Die C tear resistance | 44 pli |
| 25% compression set, Method B- | 6% |
| 10% compression load deflection | 146 psi |
| Shore $A_2$/O sec hardness at 1 hr. | 65 |
| Overnight | 70 |
| Maximum | 72 |

The following examples show the critical necessity of preparing a modified isocyanate composition which is comprised of the proper mixture of diisocyanate and a biuret isocyanate derived therefrom, which mixture falls within the limits set forth above.

EXAMPLE 21

Into a 3-liter, 3-necked flask equipped with a stirrer, thermometer, reflex condenser, addition funnel and nitrogen purge was charged 2500 g (20 equivalents) of diphenylmethane diisocyanate. The isocyanate was heated to 120° C. and 18 g (2 equivalents) of water was added over a twenty minute period. The reaction exothermed to 135° C. and gave off carbon dioxide. The reaction mixture was then heated an additional two hours at 120° C. until carbon dioxide evolution ceased. The liquid product had an isocyanate content of 6.96 meg/g (equivalent weight-143.7), and was calculated to contain 17 percent of biuret isocyanate. A flexible foam of excellent cell structure can be prepared from this product.

EXAMPLE 22

Here, two samples were prepared which had a biuret content outside the maximum desirable limit set out above. In each instance, as is seen below, either a foam could not be prepared, or the cured foam was substantially useless from a practical standpoint.

The water-modified product of Example 21 was treated to adjust the mixture outside the scope of the invention. Specifically, the unmodified diphenylmethane diisocyanate was partially removed by flashing it from the product mixture at 180°–190° C. at 0.5 mm/Hg. The overhead-to bottoms ratio was 38.4:61.6. The bottoms had an isocyanate content of 6.34 meq/g (equivalent weight of 157.7). The composition of the bottoms had then the following analysis, basis GPC: 4,4'-diphenylmethane diisocyanate-55.5 percent; biuret isocyanate 27.7 weight percent; and polymeric isocyanate 16.8 weight percent.

In yet another run unmodified diphenylmethane diisocyanate was removed from the water-treated product mixture of Example 21 by means of extraction in this instance. To 109 g of the water-treated product was added 200 ml toluene. Petroleum either (1 liter) was then added and the mixture allowed to stand fifteen minutes and then filtered. The recovered solids (34.9 g) were then dried under vacuum. The recovered product had an isocyanate content of 4.94 meq/g (202.4 equivalent weight). Its composition, basis GPC analysis was as follows: 4,4'-diphenylmethane diisocyanate 21.1 weight percent; biuret isocyanate 49.2 weight percent; and polymeric isocyanates 29.6 weight percent.

EXAMPLES 23–24

Here the products of Example 22 were tested for their utility in preparing flexible foams. As is readily evident below such foams were unsatisfactory. Thus, it is clear that for best results the biuret portion of the mixtures of the invention should not comprise much more than about 25 weight percent of the mixture.

Results in this test are given below in Table VII. The first product tested of Example 22 was that product wherein the unreacted diphenylmethane diisocyanate was removed by flashing. This product is designated as Example 22-A. The product designated Example 22-B is that mixture obtained by extracting out from the product of Example 21 unreacted diphenylmethane diisocyanate.

TABLE VII

| Foam No. | 23 | 24 |
|---|---|---|
| Formulation, pbw | | |
| THANOL ® SF-5505[1] | 100 | 100 |
| JEFFAMINE ® AP-22 | 2 | 2 |
| Water | 2.7 | 2.7 |
| L-5303 silicone | 1.0 | 1.0 |
| Dibutyltin dilaurate | 0.006 | 0.006 |
| THANCAT ® DM-70 | 0.25 | 0.25 |
| Isocyanate mixture-Example 22-A | 59.9 | — |
| Isocyanate mixture-Example 22-B | — | 69 |
| Isocyanate index | 0.9 | 0.9 |
| Details of preparation | | |
| Cream time, sec | ~22 | Not determined little rise occurred |
| Rise time, sec | ~125 | Impossible to mix; dispersal solids did not appear to react. |
| Results | Very difficult to mix; cured foam had large internal voids and hard spots. | |

[1]High reactivity polyether triol; Jefferson Chemical Co.

In the Examples below, again a isocyanate of the invention was directly compared with a mixture wherein the biuret isocyanate exceeded the amount discovered here to be necessary to achieve proper foam formation.

EXAMPLE 25

Into a 1-liter, 3-necked flask equipped with a stirrer, addition funnel, thermometer, reflex condenser and nitrogen purge was charged 500 g (4 equivalents) of diphenylmethane diisocyanate. The diisocyanate was heated to 120° C. and 3.6 g of water (0.4 equivalents) added over a twenty-minute period. The reaction mixture was then heated an additional two hours at 120° C. until carbon dioxide evolution ceased. The resultant product had an isocyanate content of 7.09 meq/g and an equivalent weight of 141. Its composition analysis via GPC was as follows: biuret isocyanate 18 percent; diphenylmethane diisocyanate 76 percent; and polymeric isocyanates 6 percent.

The product mixture just described was then extracted in order to remove diphenylmethane diisocyanate. Specifically, the water-treated product in an amount of 110 grams was treated by adding 200 ml. of toluene. Petroleum ether in an amount of 1 liter was added with stirring. Upon standing the mixture separated into two layers. Solvent was removed from both layers by vacuum stripping. The upper layer residue amounted to 83.2 g while a lower layer of 21.5 g of isocyanate containing biuret was recovered.

The upper layer residue, termed Example 25-A had an isocyanate content of 7.72 meq/g and an equivalent weight of 129.5. The diphenylmethane diisocyanate content was 92 percent by weight and the biuret isocyanate was 4 percent by weight, with the remainder being polymeric isocyanates. A lower layer residue, Example 25-B had an isocyanate content 4.72 meq/g and an equivalent weight of 211.9. The diphenylmethane diisocyanate content was 21 percent, the biuret isocyanate content was 57 percent; with the remainder being polymeric isocyanate.

EXAMPLES 26–27

This example again shows that when the biuret content exceeds the aforementioned limits poor foams are prepared if at all. In addition, the following demonstrates that, on the other hand, even when only seemingly low amounts of biuret isocyanate are present, in this instance 4 percent, excellent foams can be prepared nonetheless. Again, the biuret isocyanate content of the water-treated isocyanate should be in the range of 3–25 weight percent based on the entire weight of the mixture of biuret isocyanate and polyisocyanate. Results are given below in Table VIII.

TABLE VIII

| Foam no. | 26 | 27 |
|---|---|---|
| Formulation, pbw | | |
| THANOL ® SF-5505 | 100 | 100 |
| JEFFAMINE ® AP-22 | 2 | 2 |
| Water | 2.7 | 2.7 |
| L-5303 silicone | 2.0 | 2.0 |

TABLE VIII-continued

| Foam no. | 26 | 27 |
| --- | --- | --- |
| THANCAT ® DD | 0.75 | 0.75 |
| THANCAT ® DM-70 | 0.25 | 0.25 |
| Dibutyltin dilaurate | 0.02 | 0.02 |
| Isocyanate mixture-Example 25-A | — | 44.4 |
| Isocyanate mixture-Example 25-B | 72.5 | — |
| Isocyanate index | 0.9 | 0.9 |
| Details of preparation | | |
| Cream time, sec | Not determined | 10 |
| Rise time, sec | Very little rise occurred | 30 |
| Results | Did not mix well, large lumps in mixture, little reaction occurred. | Slight collapse at 30 sec., after post cure the foam was generally good with some voids. |

From the foregoing description and examples of this invention, those of ordinary skill in the art may make many modifications and variations therefrom without departing from the scope of the invention as hereinafter claimed.

We claim:

1. A method of producing an improved flexible polyurethane foam which comprises reacting in presence of a blowing agent and a catalyst for polyurethane polymer formation, a polyol and a water-modified diphenylmethane diisocyanate obtained from water-treating a diphenylmethane diisocyanate to provide a diisocyanate mixture comprising 3–25 percent by weight of diphenylmethane biuret isocyanate and 75–97 percent by weight of diphenylmethane diisocyanate.

2. The method of claim 1 wherein said polyol is a polyester or polyether having a hydroxyl number from about 25 to about 700.

3. A flexible polyurethane foam derived from the method of claim 1.

* * * * *